July 26, 1932. LA VERNE C. STURGIS 1,868,857
INCUBATOR
Filed June 14, 1929
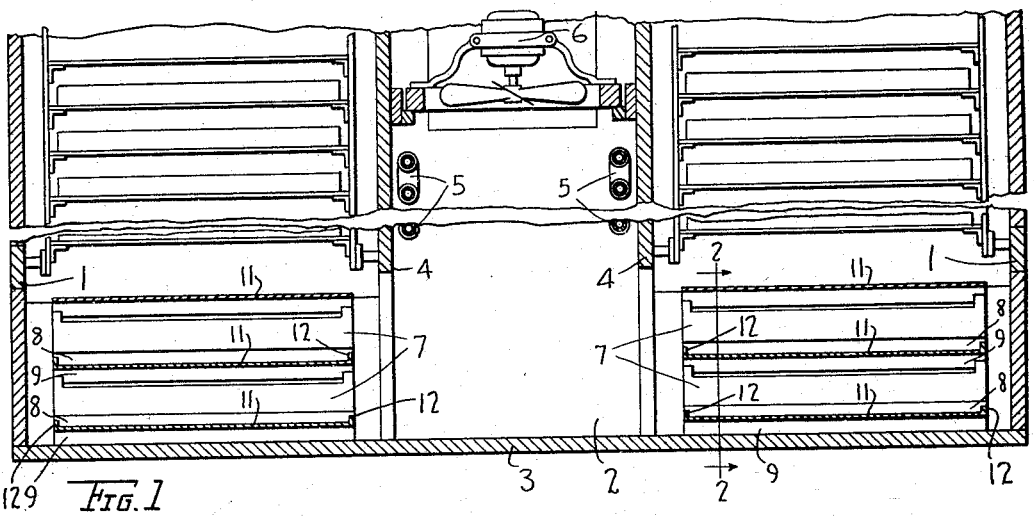
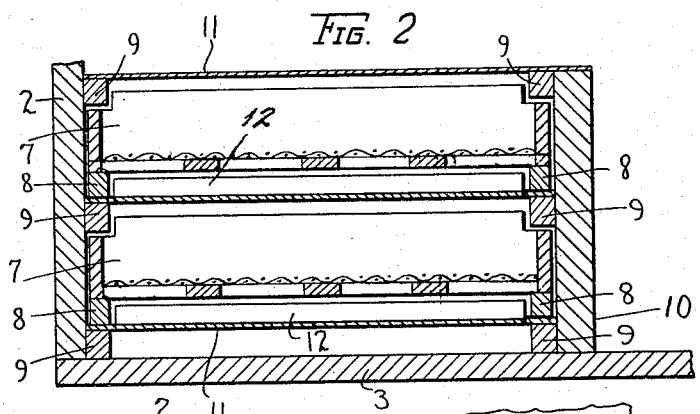
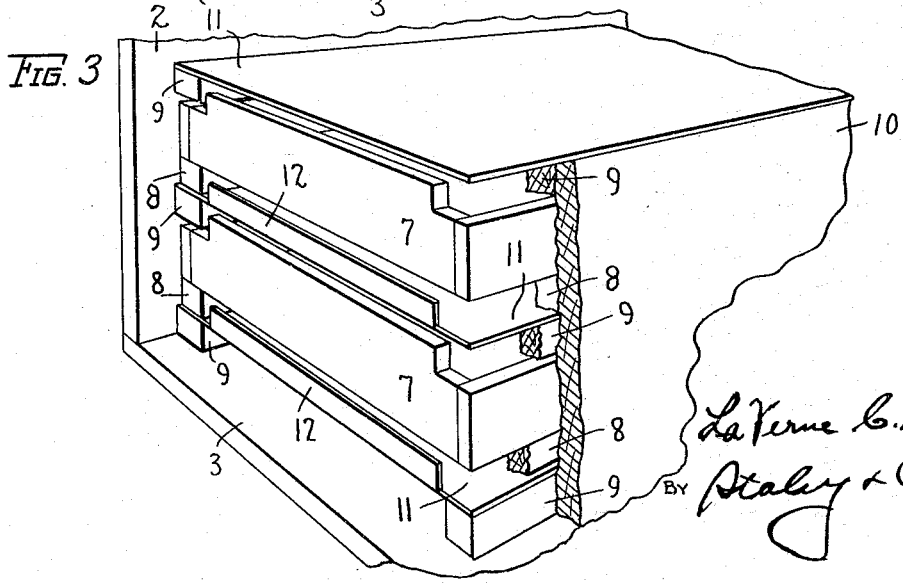
INVENTOR
La Verne C. Sturgis
BY Staley & Welch
ATTORNEYS Patented July 26, 1932

1,868,857

UNITED STATES PATENT OFFICE

LA VERNE C. STURGIS, OF SPRINGFIELD, OHIO, ASSIGNOR, BY MESNE ASSIGNMENTS, TO THE BUCKEYE INCUBATOR MANUFACTURING COMPANY, OF BEACHWOOD, OHIO, A CORPORATION OF OHIO

INCUBATOR

Application filed June 14, 1929. Serial No. 371,007.

This invention relates to incubators and more particularly to incubators of the mammoth type in which a series of hatching trays are employed, together with means for circulating heated air through the trays.

One of the objects of my invention is to provide simple and effective means for confining the air flow to the individual hatching trays to prevent the heat from the eggs in one tray from being carried to another tray and to also retard disease germs from being carried from one tray to another.

A further object of the invention is to provide simple and effective means for arresting a flow of the chick fluff and other refuse matter coming from the trays.

In the accompanying drawing:

Fig. 1 is a vertical section of so much of an incubator chamber as is necessary to illustrate my improvements.

Fig. 2 is a section on the line 2—2 of Fig. 1.

Fig. 3 is a perspective view of one of the series of hatching trays.

Referring to the drawing, there is shown a portion of an enclosed chamber in which the hatching trays as well as the trays containing the eggs in the process of incubation are located, this chamber having side walls 1, end walls 2, a floor 3 and a ceiling and roof (not shown). In the particular type of incubator shown there are provided division walls 4 to divide the chamber into a central corridor and two side incubating and hatching compartments. Heating coils 5 are located in the central corridor and in the upper portion thereof there is mounted an electric fan 6 which directs the air downwardly through the central corridor and upwardly through the side compartments which communicate with the central corridor at the upper and lower ends thereof.

The trays are slidably mounted upon longitudinal strips 9 which are attached to the end walls 2 and also to suitable transversely extending intermediate vertical supports 10 which form enclosures for the sides of the trays; the trays being provided with supporting strips 8 on each side of the bottom thereof so that the trays will be suitably spaced apart.

Above and below each tray is a baffle member, each member being constructed in the present case of a plate 11 of sheet metal. Each baffle plate, excepting the uppermost has its ends upturned as indicated at 12, the height of the upturned end being such as to leave a space for the passage of air between the upper edges thereof and the adjacent tray so that the flow of air over and under and through the trays will be unobstructed.

The purpose of the upturned ends of the plates is to provide a dead air space above each baffle plate whereby the fluff and other refuse matter circulated with the air will be caused to settle upon the plates and thus remove the fluff and refuse matter from the air circulation.

These plates also act to prevent the air which passes over any one tray from circulating through the tray or trays immediately above it to prevent the heat of the eggs in one tray from being carried to another tray and also retard the dissemination of disease germs.

Having thus described my invention, I claim:

1. A plurality of horizontal non-tiltable hatching trays each having an openwork bottom arranged in spaced relation one above another, a compartment for said trays open only at its ends, a horizontal baffle member between adjacent trays in spaced relation therewith, said baffle member being formed as a separate element from the trays, and means for forcibly circulating air from one open end of said compartment to the other.

2. A plurality of hatching trays each having an openwork bottom arranged in spaced relation one above another, a compartment for said trays open only at its ends, a horizontal baffle member between adjacent trays in spaced relation therewith, said baffle member being formed as a separate element from the trays, and means for forcibly circulating air from one open end of said compartment to the other, said baffle member having a pocket on its upper side to provide a settling space.

3. A plurality of hatching trays each having an openwork bottom arranged in spaced relation one above another, a compartment for said trays open only at its ends, a horizontal baffle member between adjacent trays in spaced relation therewith, said baffle member being formed as a separate element from the trays, and means for forcibly circulating air from one open end of said compartment to the other, said baffle having its ends upturned, with the upturned ends extending at right angles to the general direction of flow of the air to provide a dead air space on the upper surface of the baffle.

4. In an incubator, a stack of trays supported one above another in spaced relationship, each tray having an open bottom, a baffle member above each tray, said baffle members between adjacent trays being in spaced relationship therewith, each baffle member except the upper one having upturned ends to form an air pocket below an upper adjacent tray, and means to force air over the trays.

5. In an incubator, a chamber having a pair of walls forming the chamber into side compartments and an intermediate corridor, each wall having an opening at its lower end leading from the corridor into a compartment, a stack of trays in each compartment adjacent the opening in the wall, a baffle member above each tray, said baffle members between adjacent trays of each stack being spaced therefrom, each baffle member except the upper ones having upturned ends to form an air pocket below an upper adjacent tray, and means in the corridor to force air through the openings and over eggs in the trays.

In testimony whereof, I have hereunto set my hand this 11th day of June 1929.

LA VERNE C. STURGIS.